No. 684,787. Patented Oct. 22, 1901.
W. BUCKLEY.
MOTOR CYCLE.
(Application filed Jan. 26, 1901.)
(No Model.) 2 Sheets—Sheet 1.
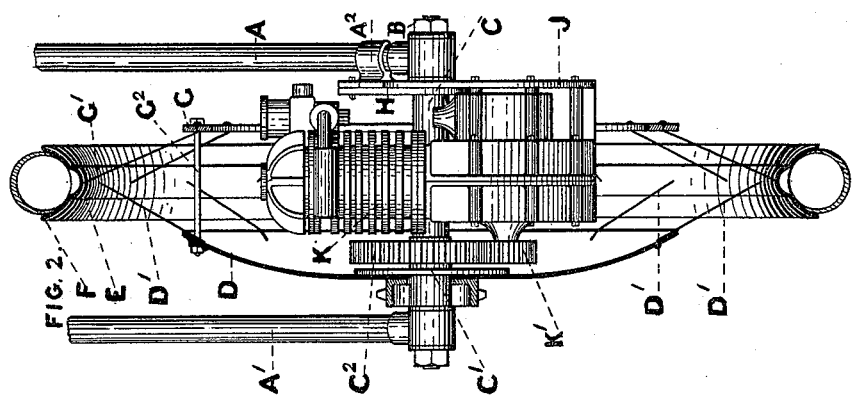
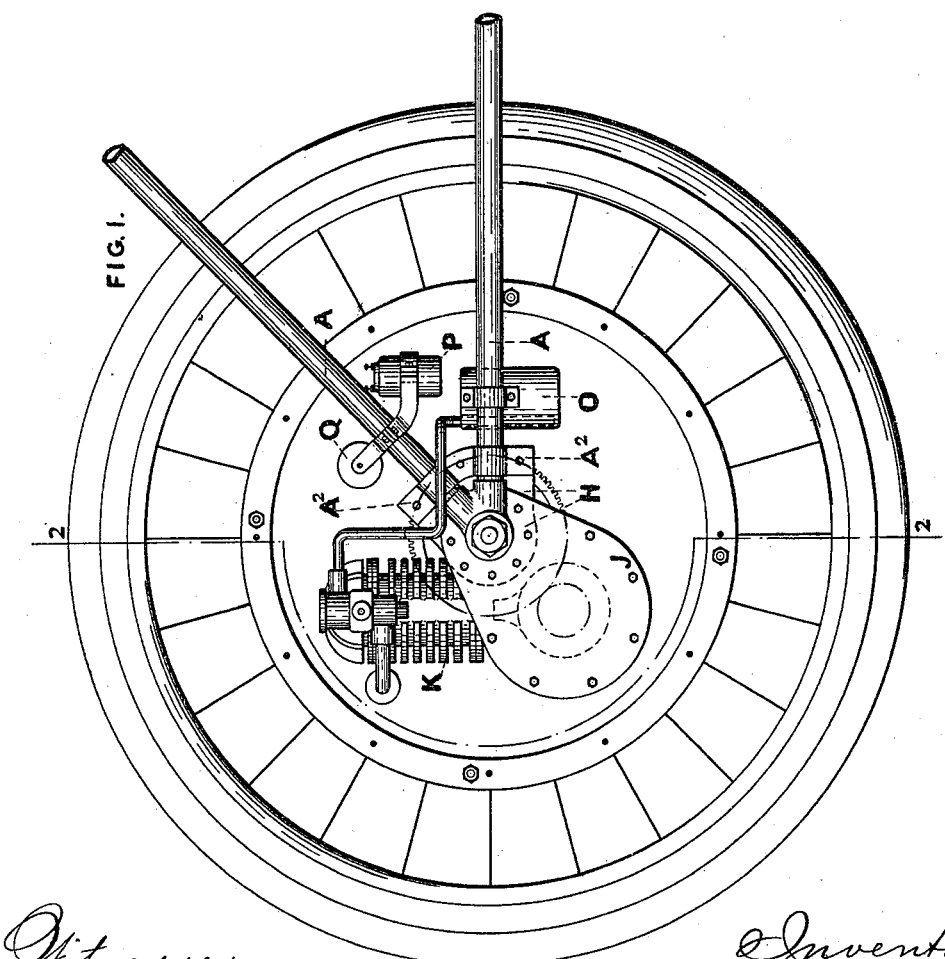

No. 684,787. Patented Oct. 22, 1901.
W. BUCKLEY.
MOTOR CYCLE.
(Application filed Jan. 26, 1901.)
(No Model.) 2 Sheets—Sheet 2.
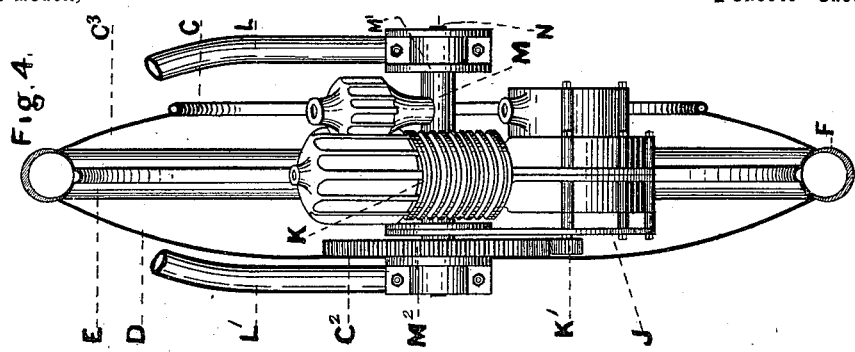
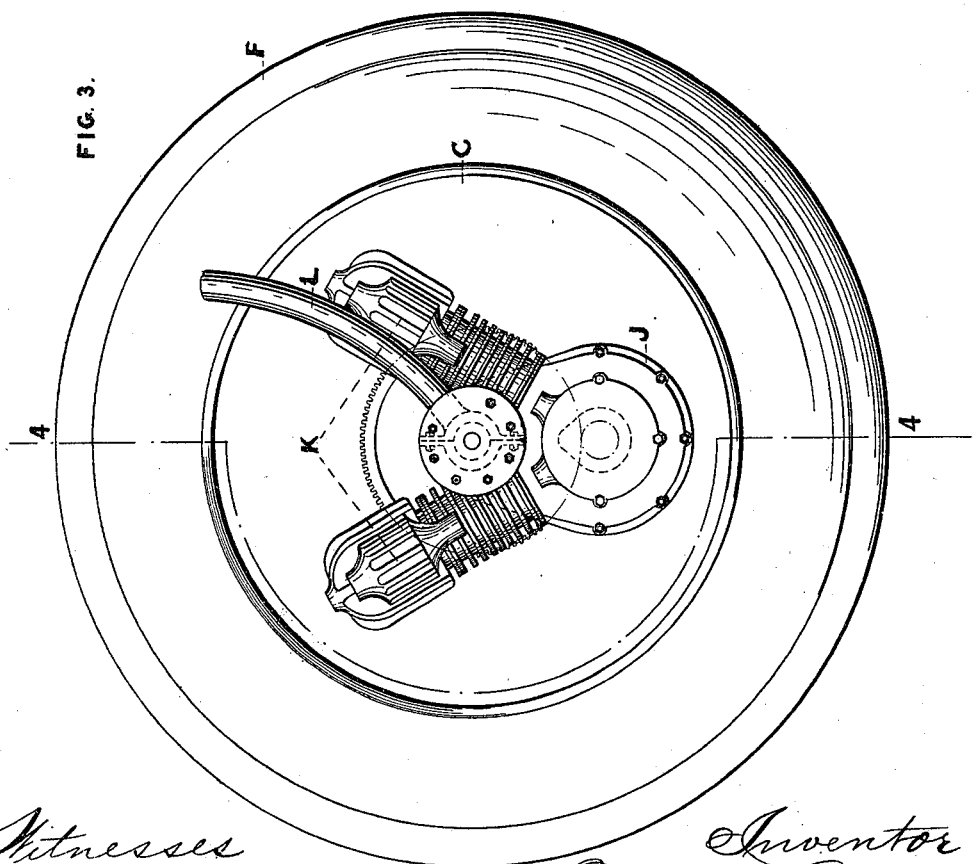

UNITED STATES PATENT OFFICE.

WILLIAM BUCKLEY, OF SHEFFIELD, ENGLAND.

MOTOR-CYCLE.

SPECIFICATION forming part of Letters Patent No. 684,787, dated October 22, 1901.

Application filed January 26, 1901. Serial No. 44,883. (No model.)

*To all whom it may concern:*

Be it known that I, WILLIAM BUCKLEY, a subject of the Queen of England, residing at Sheffield, county of York, England, have invented certain new and useful Improvements in or Relating to Motor-Driven Wheels for Cycles and the Like, (for which I have made application for Letters Patent in Great Britain, under No. 17,357, dated October 1, 1900,) of which the following is a specification.

The object of this invention is to provide means by which the motor and its driving mechanism may be arranged within the road-wheel it is desired to drive, the wheel being so constructed that the motor or any of its parts may be readily removed without having to unbuild the wheel or remove either of its supports.

According to one method of carrying out this invention a fixed axle is mounted between the blades, for instance, of a cycle-fork, and upon this axle is a hollow hub free to revolve about the fixed axle. The road-wheel is built upon this revoluble hub or bearing and may comprise a dished disk secured to one extremity of the hub and having its circumference, to which the rim is attached, in or near the central plane of the wheel. The rim is thus supported on one side by the disk and may be supported on the opposite side by spokes or their equivalents, the inner ends of which, however, are not secured to the revoluble hub, but to a floating ring or some such device free to revolve around some fixed part of the frame or around the stationary central axle before mentioned. The space between the two sides of the wheel is made of sufficient dimensions to contain a motor and its driving mechanism, which, if desired, may be inclosed in a suitable box or casing. The motor is secured to some stationary part of the frame, such as that around which the central extremities of the spokes revolve, or to the fixed central axle. The motor may be arranged to drive onto the hollow revoluble hub by means of a pinion mounted on the motor-shaft gearing with a toothed wheel secured to the hub, or gearing may be arranged to connect the motor-pinion with an internally-toothed wheel secured to the internal circumference of the road-wheel. In place of a disk on one side of the road-wheel both sides may be built up of spokes or their equivalents, the spokes on one side being, however, arranged in such a manner that sufficient space is left between them to permit of the insertion and removal of the motor. If preferred, however, the spokes on one side of the wheel may be dispensed with. Shield-plates may be provided to cover in the mechanism within the wheel, these plates being fixed to the frame of the machine or to some part attached thereto, so that they do not revolve with the wheel.

According to a modified construction of this apparatus the road-wheel may be built upon the central axle, which in this case is free to revolve within bearings secured to the blades of the fork. When thus arranged, the hollow axle which formerly formed the hub of the wheel is secured rigidly to some part of the frame and forms an additional support for the plate or bracket carrying the motor, or it may be entirely dispensed with.

The motor may obviously be driven by any known source of power, such as steam or oil, or it may be an electric motor.

It will be understood that although a cycle-fork has been referred to as the support for the wheel any other form of support may be used.

In the accompanying drawings, Figure 1 is an elevation of a motor-driven wheel constructed according to this invention and arranged as the back wheel of a bicycle. Fig. 2 is a sectional elevation taken on line 2 2 of Fig. 1. Fig. 3 is an elevation of a modified construction of wheel according to this invention. Fig. 4 is a sectional elevation on the line 4 4 of Fig. 3.

Like letters indicate like parts throughout the drawings.

With reference, first, to Figs. 1 and 2, the forks A A' are connected by a fixed axle B, upon which a revoluble member or hub C is mounted. Rigidly secured to a flange C', formed on one end of the revoluble hub C, is a dished disk D, the outer edge of which is coupled to the rim E of the wheel F by a series of short spokes or connecting-pieces D'. One side of the wheel is thus internally concave and is composed of the dished disk D and spokes D'. On the other side a ring G is secured to the rim E by short spokes G'. The ring G may be further secured in position by distance-pieces G², connecting it with the dished disk D. With this construction of wheel the side occupied by the ring G will be open, so as to allow the interior of the wheel to be readily accessible. Upon the fork A on the open side of the wheel F a bracket A² is secured, and a plate H, slotted so as to pass the revoluble hub C, is bolted or otherwise fixed to the bracket A². The plate H in turn carries a second plate J, (also slotted for the passage of the hub C,) upon which the motor K is mounted. A pinion K' is secured to the driving-shaft of the motor K and gears with a spur-wheel C², carried by the hub C.

By constructing a wheel, as described, internally concave on one side D and open on the other side the motor may be carried within the wheel and will be readily accessible for lubrication and similar purposes, while the whole motor may be easily removed from the wheel by disconnecting one of the plates J or H.

In the modified construction of motor-driven wheel illustrated in Figs. 3 and 4 the wheel is shown mounted in the front forks L L' of a bicycle. A sleeve M, flanged at each end, as shown at M' and M², is bolted or otherwise secured by one of its flanges M' to the fork L, its interior periphery constituting a bearing for a revoluble axle N, mounted between the two forks L L'. In this case the internally-concave side of the wheel is formed by the dished disk D, rigidly secured to the axle N and directly connecting the latter with the rim E of the wheel F without the interposition of the spokes D'. On the other side of the wheel the ring G is formed by turning up the inner edge of a sheet-metal annulus G³, whose outer edge is secured to the rim E. The motor-carrying plate J is bolted or otherwise secured to the flange M² of the sleeve M, so that the motor K is carried within the wheel F, the pinion K' gearing with the spur-wheel C², which in this case may conveniently be in the form of an annulus secured to the concave side of the dished disk D, as shown.

It will be seen that in both constructions of motor-driven wheel described above the motor is mounted within the wheel and is carried by the wheel-support in such a manner that it can be easily removed through the open side of the wheel without the necessity of taking the wheel to pieces or removing it from its bearings. The open side of the wheel also allows the controlling devices to be easily connected to the motor.

Although it is preferred in all cases to employ the ring G for strengthening purposes with or without the distance-pieces G², it is to be understood that it may be dispensed with without departing from this invention. Moreover, the dished disk D might, if desired, be replaced by suitably-situated spokes.

The motor accessories—such as the carbureter O, battery P, and sparking-coil Q—may be secured to the wheel-support and arranged within the open side of the wheel, as shown in Figs. 1 and 2, or they may be carried by some other part of the vehicle, as desired.

Although the motor-driving wheel has been described as mounted in the forks of a bicycle, it is to be understood that it may be applied to other vehicles.

What I claim as my invention, and desire to secure by Letters Patent, is—

1. In a motor-driven wheel the combination of an axle-support a revoluble member at the axis a dished disk connecting said revoluble member with the rim and a bracket on the axle-support carrying a motor within the wheel substantially as and for the purpose described.

2. In a motor-driven wheel, the combination of an axle-support, a revoluble member at the axis, a dished disk on one side connecting said revoluble member with the rim, the other side of the wheel being open, and a bracket on the support carrying a motor within the wheel, substantially as and for the purpose described.

3. In a motor-driven wheel the combination of an axle-support a revoluble member at the axis a dished disk on one side connecting said revoluble member with the rim a floating ring on the other side and a bracket on the axle-support carrying a motor within the wheel substantially as and for the purpose described.

4. In a motor-driven wheel the combination of an axle-support a fixed axle, a revoluble member on the axle a dished disk on one side connecting the revoluble member with the rim a floating ring on the other side distance-pieces between the ring and the dished disk and a bracket on the axle-support carrying a motor within the wheel substantially as and for the purpose described.

In testimony whereof I have signed my name to this specification in the presence of two subscribing witnesses.

WILLIAM BUCKLEY.

Witnesses:
  THOMAS HARVEY,
  CHARLES WILLIAM CONE.